United States Patent
Tsuda et al.

[11] Patent Number: 6,151,003
[45] Date of Patent: Nov. 21, 2000

[54] LIQUID CRYSTAL DISPLAY DEVICE OPERATING IN A VERTICALLY ALIGNED MODE

[75] Inventors: Hideaki Tsuda; Katsufumi Ohmuro; Yoshio Koike, all of Kawasaki, Japan

[73] Assignee: Fujitsu Limited, Kawasaki, Japan

[21] Appl. No.: 09/174,514

[22] Filed: Oct. 16, 1998

[30] Foreign Application Priority Data

Oct. 21, 1997 [JP] Japan .................................. 9-288556

[51] Int. Cl.⁷ ...................................................... G09G 3/36
[52] U.S. Cl. ........................ 345/87; 349/141; 252/299.63
[58] Field of Search .............................. 345/87; 349/141, 349/145, 156, 113; 252/299.1, 299.61, 299.63

[56] References Cited

U.S. PATENT DOCUMENTS 6,066,268  5/2000  Ichinose et al. .................. 252/299.63

FOREIGN PATENT DOCUMENTS 990943  4/2000  European Pat. Off. .

*Primary Examiner*—Amare Mengistu
*Attorney, Agent, or Firm*—Greer, Burns & Crain, Ltd.

[57] ABSTRACT

A vertically aligned liquid crystal display device includes a liquid crystal layer of a negative dielectric anisotropy set to fall in a range between about −3.8 and about −2.0

15 Claims, 18 Drawing Sheets

θ : PRETILT ANGLE

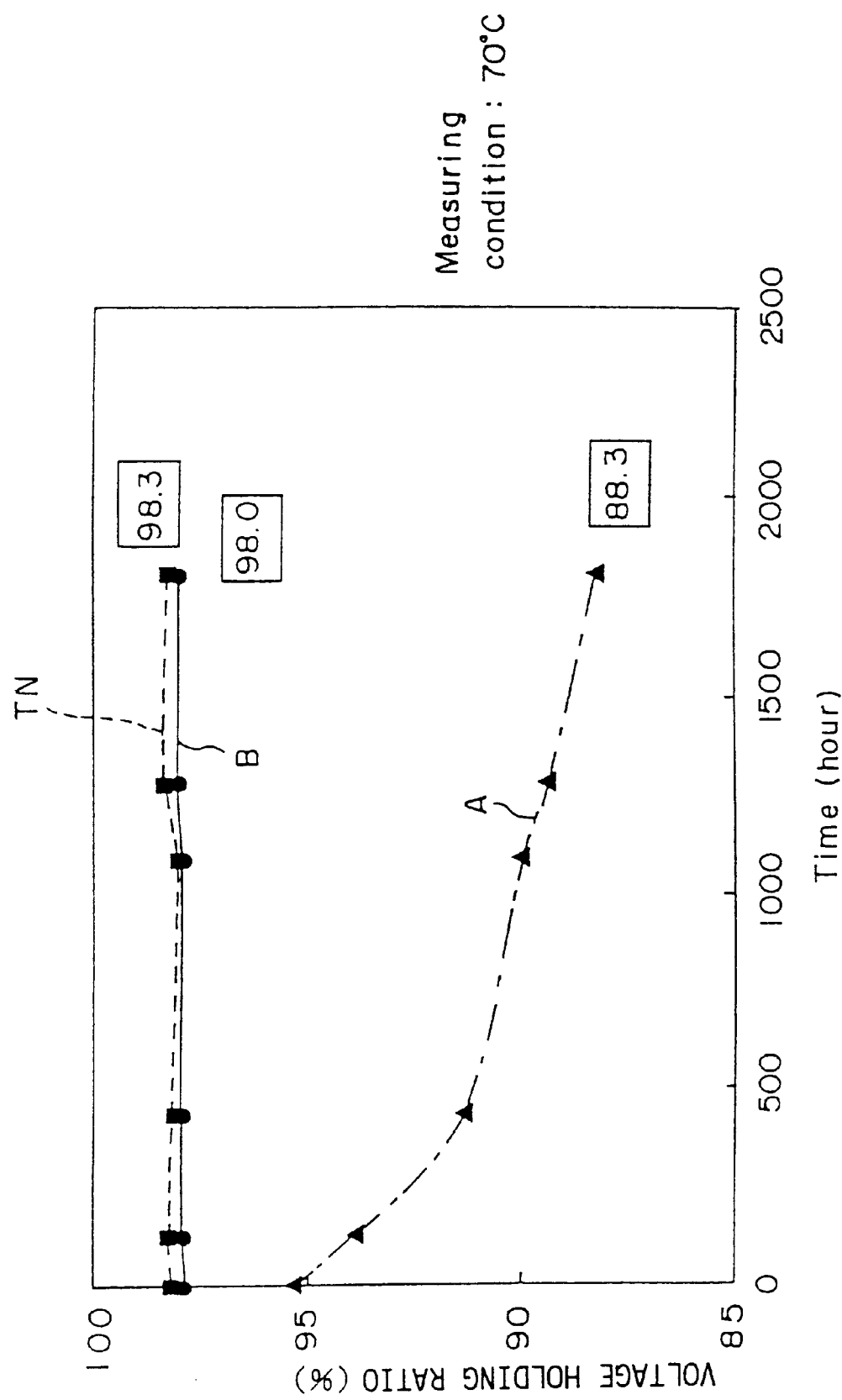

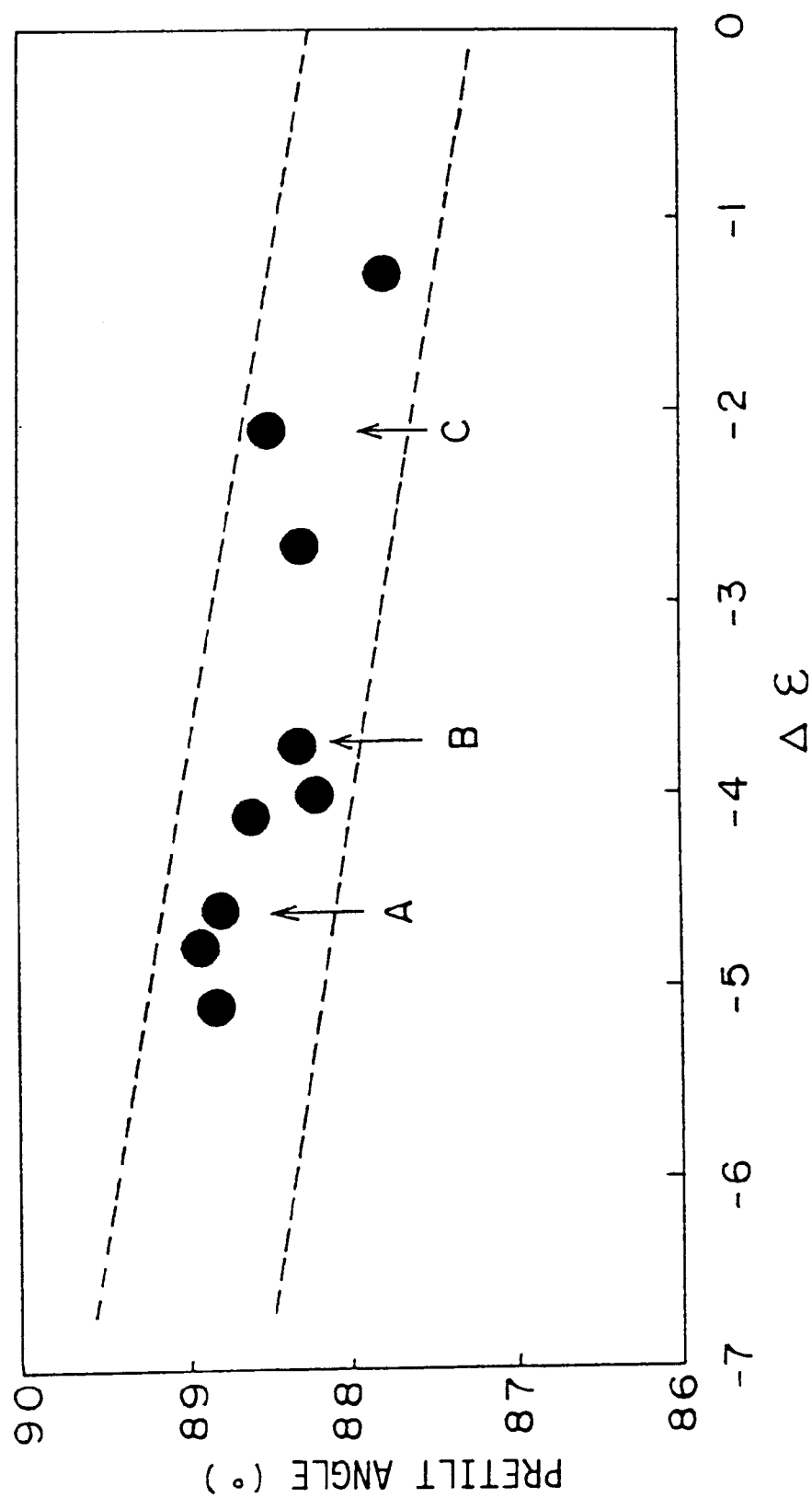

LIQUID CRYSTAL DISPLAY DEVICE OPERATING IN A VERTICALLY ALIGNED MODE

BACKGROUND OF THE INVENTION

The present invention generally relates to liquid crystal display devices and more particularly to a liquid crystal display device operating in a so-called VA (Vertically Aligned) mode in which liquid crystal molecules having a negative dielectric anisotropy are aligned generally perpendicularly to a panel surface of the liquid crystal display device.

Liquid crystal display devices are used as a display device of various information processing apparatuses such as a computer. Liquid crystal display devices, having a compact size and consuming little electric power, are particularly suitable for application in portable information processing apparatuses. On the other hand, use of such liquid crystal display devices also in a fixed-type information processing apparatus such as a desktop-type computer, is also studied.

Conventional liquid crystal display devices generally use a so-called TN (Twisted Nematic)-mode construction in which p-type liquid crystal molecules having a positive dielectric anisotropy are aligned horizontally between a pair of mutually opposing panel substrates, wherein the liquid crystal molecules adjacent to one panel substrate and the liquid crystal molecules adjacent to the other panel substrate are aligned in respective directions crossing with each other perpendicularly.

In such a TN-mode liquid crystal display device, various liquid crystals are already developed, and the liquid crystal display device can be fabricated by a well-established process with low cost.

On the other hand, a TN-mode liquid crystal display device has a drawback in realizing a high contrast representation of images. It should be noted that a TN-mode liquid crystal display device provides a black representation by causing the liquid crystal molecules to align vertically to the principal surface of the panel substrate by applying a driving electric field, while the liquid crystal molecules immediately adjacent to the panel substrate tend to maintain the horizontal alignment even when the driving electric field is applied. Thereby, the birefringence associated with such horizontal liquid crystal molecules allows a passage of light even in the activated state in which the passage of light through the liquid crystal layer should be interrupted completely. Thus, there occurs a leakage of light, or sometimes a coloring of the panel, when an attempt is made in a TN-mode liquid crystal display device to display a white image on a black background (so-called "normally black mode") as is commonly adopted in a CRT display device. Thus, the black representation becomes worse than that of a "normally white mode," in which black images are displayed on a white background, because of the dispersion. This is the reason why conventional TN-mode liquid crystal display devices are operated in the normally white mode.

A VA-mode liquid crystal display device is a liquid crystal display device in which liquid crystal molecules having a negative or positive dielectric anisotropy are confined between a pair of panel substrates in a state that the liquid crystal molecules are aligned in a direction generally perpendicular to the principal surface of the panel substrates in a non-activated state of the liquid crystal display device. Thus, a light passes through a liquid crystal layer in such a liquid crystal display device without changing the polarization plane thereof in the non-activated state of the liquid crystal device, and the light is effectively interrupted by a pair of polarizers disposed at both sides of the liquid crystal layer in a crossed Nicol state. In such a VA-mode liquid crystal display device, therefore, it is possible to achieve a near-ideal black representation in the non-activated state of the liquid crystal display device. In other words, such a VA-mode liquid crystal display device can easily achieve a very high contrast representation not possible by a TN-mode liquid crystal display device.

In an activated state of a VA-mode liquid crystal display device in which a driving electric field is applied to the liquid crystal molecules by as a result of application of a driving voltage exceeding a predetermined threshold voltage, it should be noted that the liquid crystal molecules are aligned generally parallel to the panel substrates, and a substantial rotation is induced in the polarization state of an incident optical beam. Thereby, the liquid crystal molecules thus activated show a 90°—twist between the first panel substrate and the second panel substrate.

FIGS. 1A and 1B show a conventional VA-mode liquid crystal display device 10 respectively in a non-activated state (black representation mode) and an activated state (white representation mode).

Referring to FIGS. 1A and 1B, the liquid crystal display device 10 includes a lower glass substrate 11A and an upper glass substrate 11B disposed so as to face the lower glass substrate 11A, wherein the lower glass substrate 11A carries, on a top surface thereof that faces the upper glass substrate 11B, an electrode pattern 12A and a molecular alignment film 13A such that the molecular alignment film 13A covers the electrode pattern 12A. Further, the upper glass substrate 11B carries, on a bottom surface thereof that faces the lower glass substrate 11A, a transparent electrode pattern 12B and a molecular alignment film 13B such that the molecular alignment film 13B covers the electrode pattern 12B.

Further, the liquid crystal display device 10 includes a liquid crystal layer 14 between the lower and upper substrates 11A and 11B such that the liquid crystal layer 14 is confined in a gap formed between the molecular alignment film 13A on the lower glass substrate 11A and the molecular alignment film 13B on the upper glass substrate 11B, wherein it should be noted that the liquid crystal layer 14 includes liquid crystal molecules 14A each having a negative dielectric anisotropy. Further, the liquid crystal display device 10 includes a first polarizer 15A and a second polarizer called analyzer 15B respectively on the outer sides of the substrates 11A and 11B in a crossed Nicol state.

FIG. 2A shows a pre-tilt angle θ of a liquid crystal molecule 14A in a non-activated state of the liquid crystal display device 10.

Referring to FIG. 2A, it can be seen that the liquid crystal molecule 14A forms a tilted angle slightly offset from 90° in the non-activated state of the liquid crystal display device 10. By doing so, the response speed of the liquid crystal display device is improved as compared with the case in which the liquid crystal molecules are directed perpendicularly to the principal surface of the liquid crystal display device 10.

FIGS. 2B and 2C show the molecular alignment film 13A on the substrate 11A and the molecular alignment film 13B on the substrate 11B.

Referring to FIG. 2B, the molecular alignment film 13B is subjected to a rubbing process conducted in a direction rotated by an angle α in the clockwise direction from a first reference direction $ref_1$ when viewed from the upward direction of the molecular alignment film 13B. Similarly, the molecular alignment film 13A is subjected to a rubbing process conducted in a direction rotated also by the angle α in the clockwise direction from a second reference direction ref$_2$ when viewed from the upward direction of the molecular alignment film 13A, wherein it should be noted that the second reference direction ref$_2$ is opposite to the first reference direction ref$_1$. As a result of the rubbing in the upper and lower molecular alignment films 13A and 13B, there is formed a twist angle 2α in the liquid crystal molecules 14A forming the liquid crystal layer 14.

In the non-activated mode of FIG. 1A, it should be noted that no electric field is applied between the electrode patterns 12A and 12B. Thus, the liquid crystal molecules 14A, having a negative dielectric anisotropy as noted before, are aligned generally perpendicularly to the principal surface of the substrate 11A or 11B as a result of interaction with the molecular alignment film 13A or 13B. As a result of such an alignment of the liquid crystal molecules 14A, the optical beam, incident to the substrate 11A from the downward direction through the first polarizer 15A, experiences little rotation of polarization plane as it propagates through the liquid crystal layer 14. Thus, the optical beam passed through the liquid crystal layer 14 is substantially interrupted by the second polarizer 15B provided on the substrate 11B.

In the activated mode of FIG. 1B, on the other hand, a driving electric field is formed between the electrodes 12A and 12B and the liquid crystal molecules 14A having the negative dielectric anisotropy are aligned generally parallel to the principal surface of the substrate 11A or 11B. As a result of the parallel alignment of the liquid crystal molecules 14A, the optical beam incident to the substrate 11A from the downward direction through the first polarizer 15A experiences a substantial rotation of polarization plane as it propagates through the liquid crystal layer 14. Thus, the optical beam passed through the liquid crystal layer 14 exits from the second polarizer 15B provided on the substrate 11B without being interrupted.

Due to the high-contrast-ratio image representation achieved by a VA-mode liquid crystal display device, which is comparable to that of a CRT display device, it is thought that the VA-mode liquid crystal display device may be used for a display device of so-called desktop type. In order that such a VA-mode liquid crystal display device is used as a practical desktop display device, however, it is further necessary that the liquid display device is capable of providing a large view angle, in addition to large display area and high response speed.

The inventor of the present invention has discovered previously in the VA-mode liquid crystal display device 10 of FIGS. 1A and 1B, in that the view angle of the liquid crystal display device 10 decreases with increasing retardation Δn·d of the liquid crystal layer 14, and that the transmittance of the liquid crystal display device 10 in the white representation mode (activated mode), or the brightness of representation, increases with increasing retardation Δn·d of the liquid crystal layer 14. See the relationship of FIG. 3.

From the relationship of FIG. 3, it is concluded that the preferable retardation Δn·d of the liquid crystal layer 14 falls within the range of about 0.2 μm to about 0.4 μm (0.2 μm<Δn·d<0.4 μm). In FIG. 3, it should be noted that the vertical axis at the right represents the transmittance while the vertical axis at the left indicates a threshold view angle in which the contrast ratio just exceeds the value 10.

In the liquid crystal display device 10 of FIGS. 1A and 1B, on the other hand, it was discovered that the voltage holding ratio of the liquid crystal layer 14 decreases with time as indicated in FIG. 4 by a continuous line. In the case of an ordinary TN-mode liquid crystal display device in which the liquid crystal layer has a positive dielectric anisotropy, on the other hand, no such a problem occurs as indicated in FIG. 4 by a broken line. Further, it is noted that the foregoing problem of decrease of the voltage holding ratio becomes conspicuous with increasing magnitude of the dielectric anisotropy Δε of the liquid crystal layer. When the voltage holding ratio is reduced as such, the leakage current through the liquid crystal layer is increased and a serious problem of representation such as uneven brightness or color may induced, particularly in the case when the liquid crystal display device uses the art of active matrix driving.

In relation to the use of the liquid crystal molecules having negative dielectric anisotropy for the liquid crystal layer 14, it was further discovered that a d.c. voltage tends to remain in the liquid crystal layer 14 of the VA-mode liquid crystal display device 10. When such a d.c. voltage remains in the liquid crystal layer 14, there tends to occur an afterimage in the representation of the liquid crystal display device 10.

It should be noted that the foregoing problem of reduction of the voltage holding ratio and the lasting of the residual d.c. voltage can be avoided by decreasing the magnitude of the negative dielectric anisotropy Δε. However, such a decrease of the magnitude or absolute value of Δε invites a problem of the liquid crystal molecules less responding to the applied voltage and a corresponding decrease of retardation Δn·d in the liquid crystal layer. Thus, there arises a problem in that the liquid crystal display device can no longer satisfy the condition of view angle characteristics and transmittance explained with reference to FIG. 3. Further, such a decrease of magnitude of the dielectric anisotropy Δε tends to invite an increase of on/off voltage of the liquid crystal layer 14, while such an increase of the on/off voltage of the liquid crystal layer 14 necessitates a specially designed drive circuit for driving the liquid crystal layer 14.

SUMMARY OF THE INVENTION

Accordingly, it is a general object of the present invention to provide a novel and useful VA-mode liquid crystal display device wherein the foregoing problems are eliminated.

Another object of the present invention is to provide a liquid crystal display device having a liquid crystal layer of negative dielectric anisotropy, wherein the view angle is expanded, the contrast ratio is increased, the voltage holding ratio is improved, the lasting of the d.c. voltage in the liquid crystal layer is reduced and the response speed is improved.

Another object of the present invention is to provide a liquid crystal display device, comprising:

a first substrate;

a second substrate disposed generally parallel to said first substrate;

a first electrode pattern formed on a first principal surface of said first substrate facing said second substrate;

a first molecular alignment film formed on said first principal surface so as to cover said first electrode pattern;

a second electrode pattern formed on a second principal surface of said second substrate facing said first substrate;

a second molecular alignment film formed on said second principal surface so as to cover said second electrode pattern;

a liquid crystal layer confined between said first molecular alignment film and said second molecular alignment film, said liquid crystal layer comprising a liquid crystal mixture of a plurality of liquid crystal compositions at least including liquid crystal molecules having a negative dielectric anisotropy, such that said liquid crystal molecules align generally perpendicularly to said first principal surface in a non-activated state of said liquid crystal display device in which no driving voltage is applied across said first and second electrode patterns, said first substrate, said second substrate, said first electrode pattern, said second electrode pattern, said first molecular alignment film, said second molecular alignment film and said liquid crystal layer thereby forming a liquid crystal panel, a first polarization element disposed at a first side of said liquid crystal panel;

a second polarization element disposed at a second, opposite side of said liquid crystal panel;

said liquid crystal mixture having a dielectric anisotropy in a range between −3.8 and about −2.0.

Another object of the present invention is to provide a liquid crystal display device, comprising:

a first substrate;

a second substrate disposed generally parallel to said first substrate;

a first electrode pattern formed on a first principal surface of said first substrate facing said second substrate;

a first molecular alignment film formed on said first principal surface so as to cover said first electrode pattern;

a second electrode pattern formed on a second principal surface of said second substrate facing said first substrate;

a second molecular alignment film formed on said second principal surface so as to cover said second electrode pattern;

a liquid crystal layer confined between said first molecular alignment film and said second molecular alignment film, said liquid crystal layer comprising a liquid crystal mixture of a plurality of liquid crystal compositions at least including liquid crystal molecules having a negative dielectric anisotropy, said first substrate, said second substrate, said first electrode pattern, said second electrode pattern, said first molecular alignment film, said second molecular alignment film and said liquid crystal layer thereby forming a liquid crystal panel, a first polarization element disposed at a first side of said liquid crystal panel;

a second polarization element disposed at a second, opposite side of said liquid crystal panel;

said liquid crystal mixture having a dielectric anisotropy in a range between −3.8 and about −2.0.

According to the present invention, the voltage holding ratio of a liquid display device that uses a liquid crystal molecule of negative dielectric anisotropy is improved while maintaining an optimum view angle characteristic, by setting the value of the foregoing dielectric anisotropy to a range between −3.8 and about −2.0.

Other objects and further features of the present invention will become apparent from the following detailed description when read in conjunction with the attached drawings.

BRIEF DESCRIPTION OF THE DRAWINGS

FIG. 8 is a diagram showing the improvement of the voltage holding ratio achieved by the liquid crystal display device of the first embodiment of the present invention;

FIG. 9 is a diagram showing the pre-tilt angle of the liquid crystal molecules in the liquid crystal display device according to the first embodiment of the present invention;

DETAILED DESCRIPTION OF THE PREFERRED EMBODIMENTS

Principle

Figure 1A:
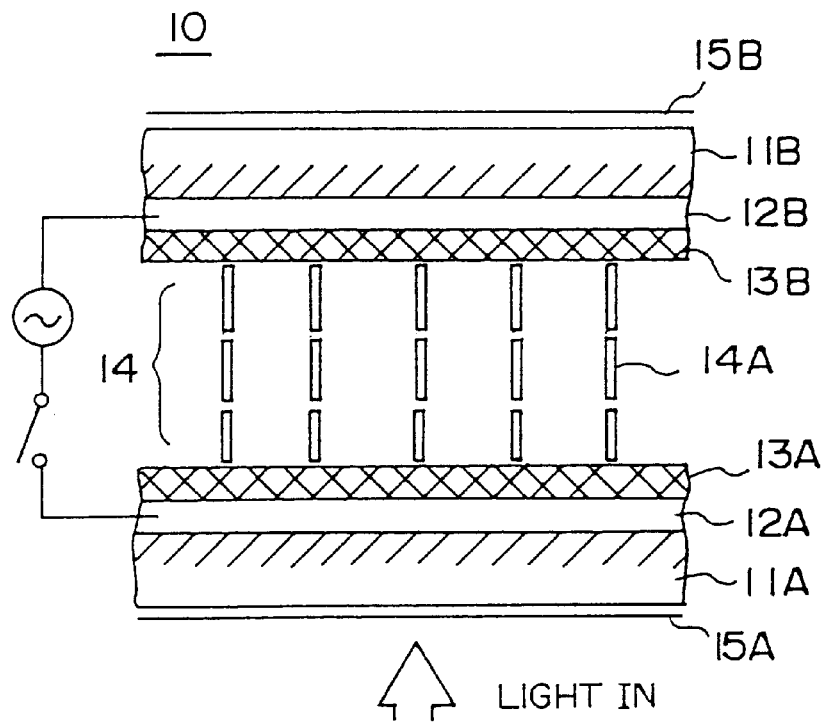
FIGS. 1A and 1B are diagrams showing the principle of a conventional VA-mode liquid crystal display device.
Figure 1B:
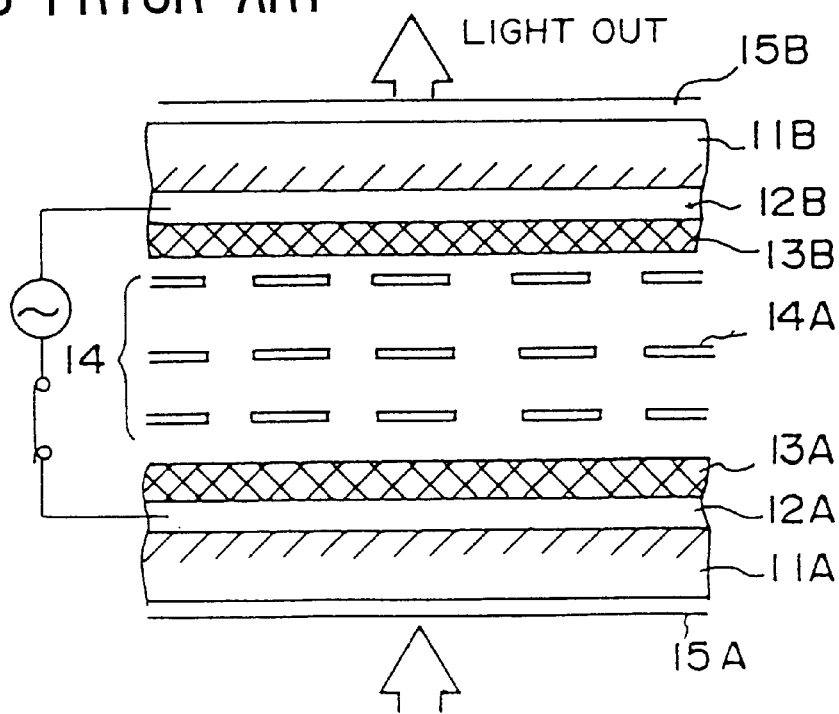
Figure 5A:
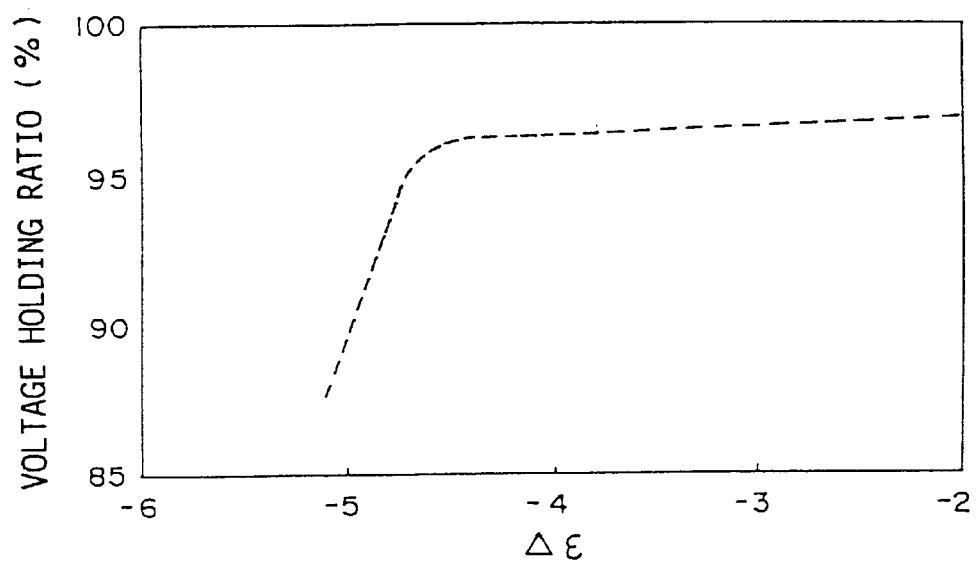
FIGS. 5A and 5B are diagrams explaining the principle of the present invention.
Figure 5B:
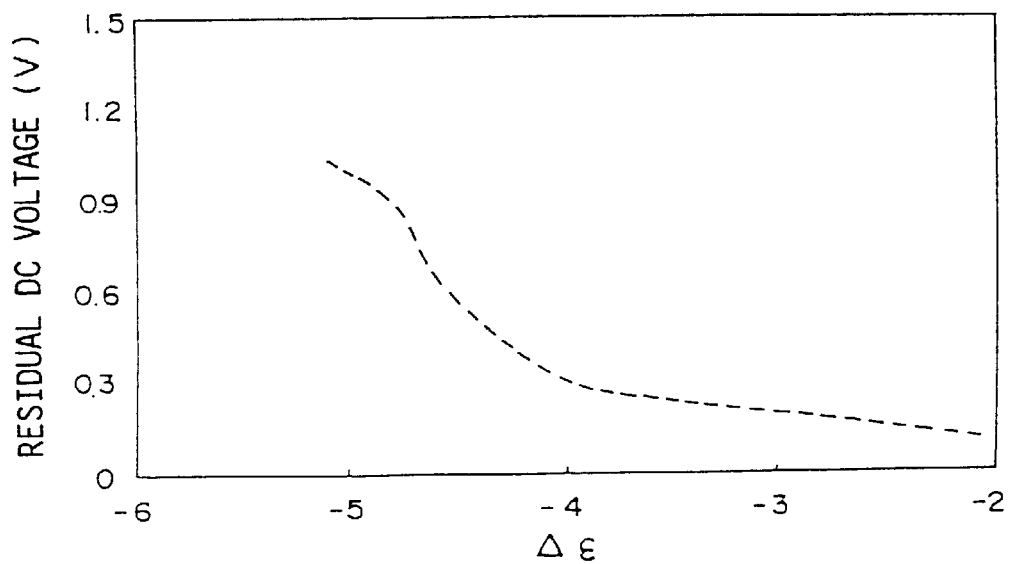

FIGS. 5A and 5B show the voltage holding ratio and the residue d.c. voltage of the VA-mode liquid crystal display device of FIGS. 1A and 1B for the case in which the value of the dielectric anisotropy Δε is changed variously, wherein FIG. 5A shows the result of measurement of the voltage holding ratio conducted at 70° C., while FIG. 5B shows the residue d.c. voltage as measured at 50° C. by a flicker erase method.

Referring to FIG. 5A, it can be seen that the voltage holding ratio of the liquid crystal layer 14 drops sharply when the magnitude of Δε has exceeded 4.5. When the voltage holding ratio is thus reduced, an electric discharge is facilitated in the liquid crystal layer 14, and the desired image representation becomes no longer possible. As explained previously, this problem becomes particularly acute in a liquid crystal display device having an active matrix construction. When the magnitude of Δε is less than about 4.5, on the other hand, it can be seen that a voltage holding ratio exceeding 95% is secured.

On the other hand, FIG. 5B indicates that the residual d.c. voltage in the liquid crystal layer 14 increases sharply when the magnitude of Δε exceeds about 4.0, and the afterimage or image sticking becomes a conspicuous problem due to the electric charges remaining in the liquid crystal layer 14.

Figure 6:
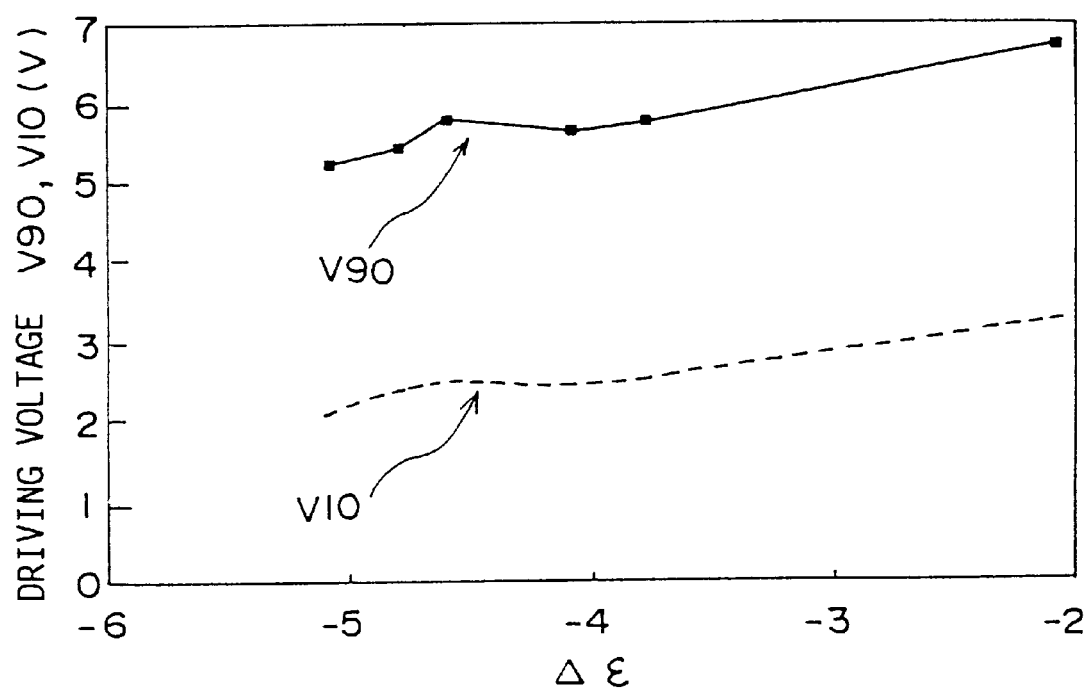
FIG. 6 is another diagram explaining the principle of the present invention.

The foregoing problems of voltage holding ratio and residual d.c. voltage are eliminated when the magnitude of the dielectric anisotropy Δε of the liquid crystal layer 14 is reduced to below 4. On the other hand, in view of the tendency of FIG. 6 that the driving voltage of the liquid crystal display device increases with a decrease of the magnitude of Δε, there arises a problem in that the liquid crystal display device can no longer be driven by a standard driver circuit when the magnitude of Δε is reduced excessively. Further, when the driving of the liquid crystal display device is made, it may not be possible to obtain a sufficient brightness and the quality of representation may be degraded accordingly. In FIG. 6, it should be noted that "$V_{10}$" and "$V_{90}$" indicates the value of the driving voltage that provides the transmittance of 10% and 91%, respectively. Further, it should be noted that excessive decrease of the magnitude of Δε invites an increase of driving voltage of the liquid crystal layer and the effective birefringence Δn of the liquid crystal layer 14 is apparently reduced. Thereby, the retardation Δn·d of the liquid crystal layer is also reduced, wherein d in the foregoing representation of retardation represents the thickness of the liquid crystal layer 14. It should be noted that the thickness d of the liquid crystal layer 14 cannot be changed arbitrarily in view of various reasons.

In the present invention, the voltage holding ratio of a liquid crystal display device that uses the liquid crystal mixture containing liquid crystal molecules of negative dielectric anisotropy is improved while simultaneously maintaining an optimum view angle characteristic, by setting the value of the foregoing dielectric anisotropy to a range between −3.8 and about −2.0, preferably between a range between −3.8 and −3.0, more preferably between a range between −3.8 and −3.5. By doing so, the problem of lasting of the residue d.c. voltage in the liquid crystal layer 14 is also eliminated.

First Embodiment

FIGS. 7A–7D show the manufacturing process of a liquid crystal display device 20 according to a first embodiment of the present invention, wherein those parts corresponding to the parts described previously are designated by the same reference numerals and the description thereof will be omitted.

Figure 7A:
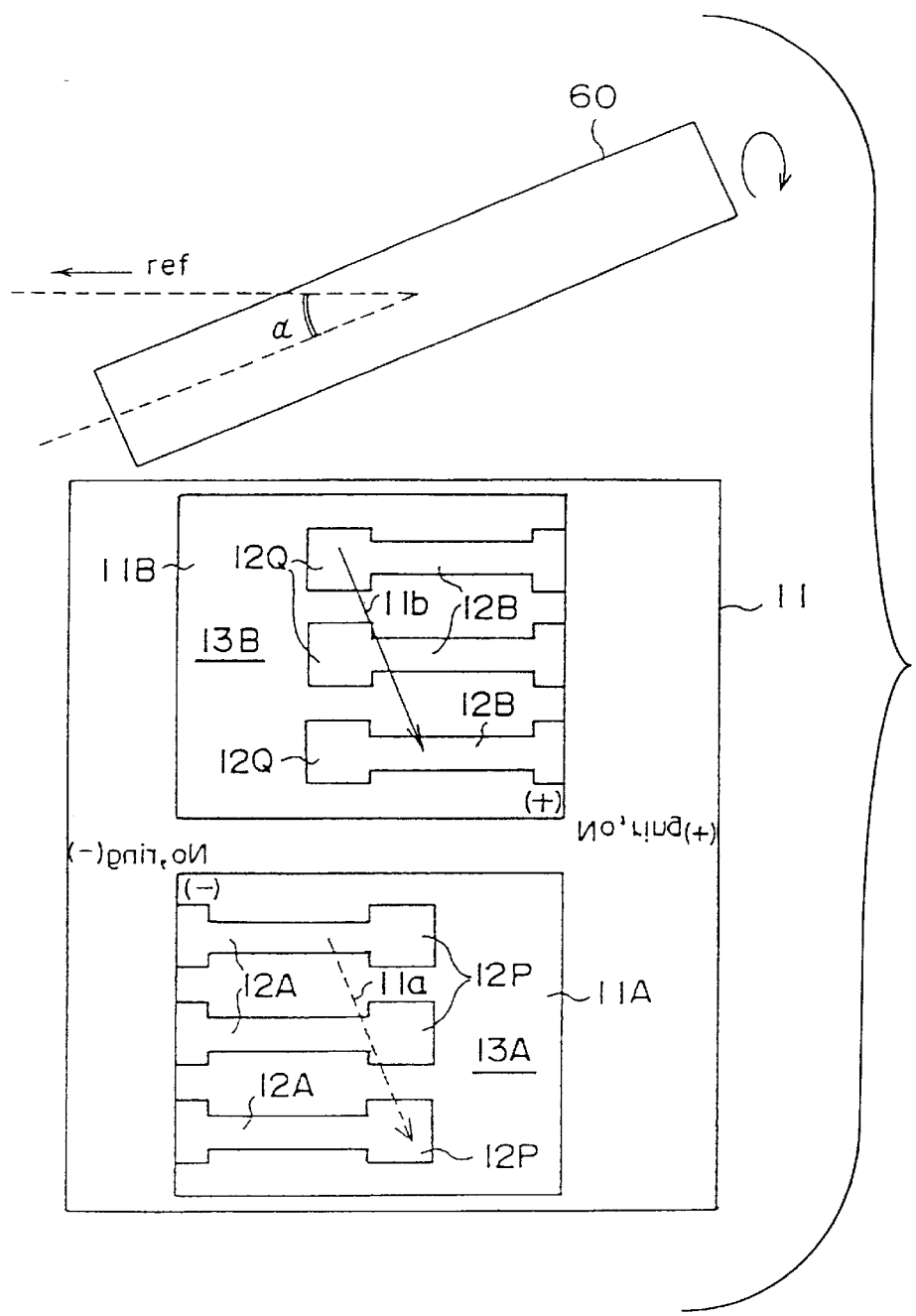
FIGS. 7A–7D are diagrams showing the manufacturing process of a liquid crystal display device according to a first embodiment of the present invention.

Referring to FIG. 7A, a large master glass substrate 11 is prepared such that substrate regions 11A' and 11B' are defined thereon in correspondence to the glass substrates 11A and 11B to be formed, wherein the foregoing electrode pattern 12A and the molecular alignment film 13A are formed on the substrate region 11A' thus defined. Similarly, the foregoing electrode pattern 12B and the molecular alignment film 13B are formed on the substrate region 11B'. In the process of FIG. 7A, it should be noted that the molecular alignment film 13A is rubbed by a rubbing roller 60 in the direction represented by a broken arrow 11a, while the molecular alignment film 13B is rubbed by the rubbing roller 60 in the direction represented by a broken arrow 11b. It should be noted that the directions 11a and 11b, in which direction the rubbing roller 60 is applied to the master substrate 11, is offset from a reference direction "ref" by an offset angle α. In FIG. 7A, each of the electrode patterns 12A includes a pixel electrode 12P in correspondence to a pixel defined in the liquid crystal layer 14. Similarly, each of the electrode patterns 12B includes a pixel electrode 12Q in correspondence to a pixel defined in the liquid crystal layer 14. Further, FIG. 7A shows a designation "No.ring(+)" or "No.ring(−)" used for discriminating the orientation of the glass substrates 11A and 11B to be formed from the master substrate 11.

Figure 7B:
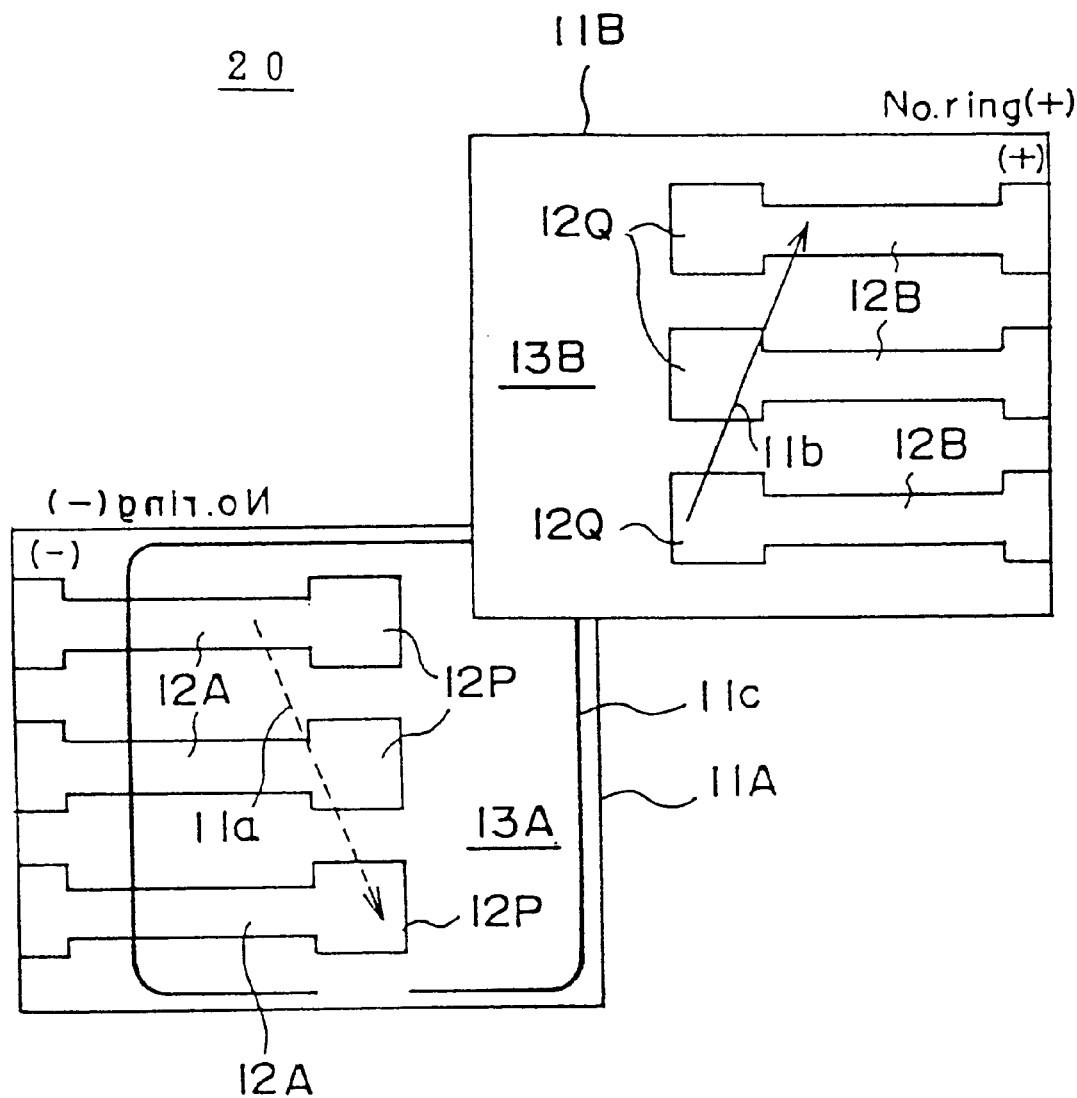

Next, in the step of FIG. 7B, the master substrate 11 is cleaved to form the glass substrates 11A and 11B, and the glass substrate 11B thus cleaved is turned over vertically as well as laterally.

Further, a seal 11c is formed on the top surface of the glass substrate 11A such that the seal 11c encloses the region of the glass substrate 11A on which the liquid crystal panel is to be formed.

Figure 7C:
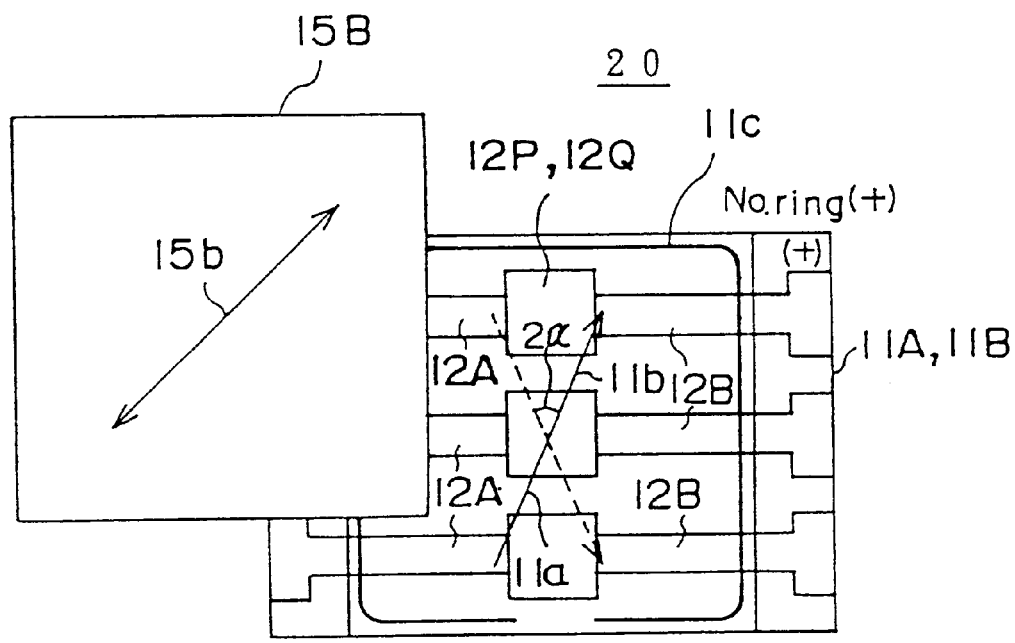
Figure 7D:
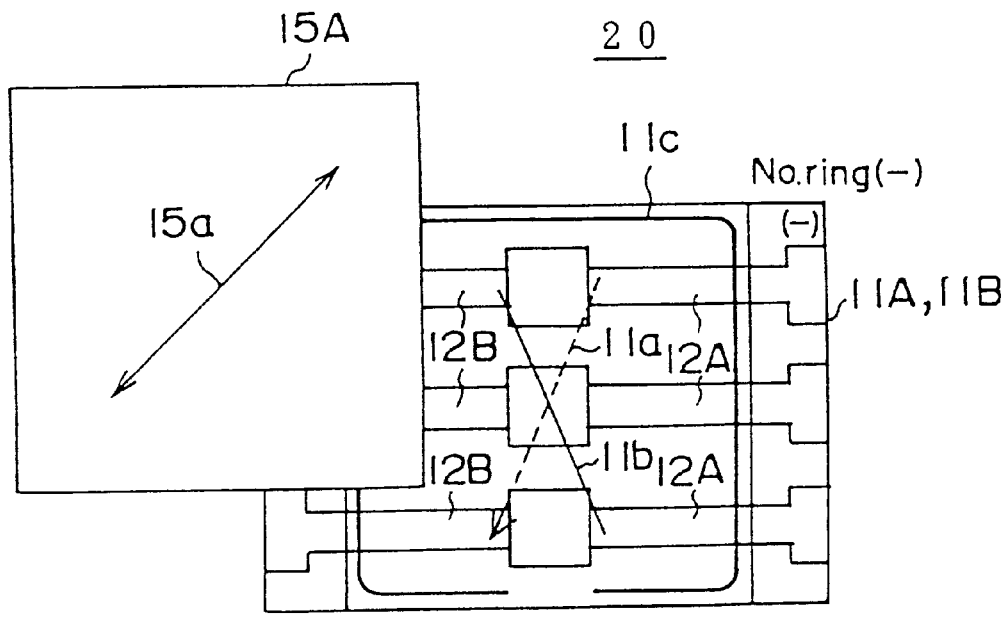

Next, in the step of FIGS. 7C and 7D, the lower glass substrate 11A and the upper glass substrate 11B are stacked each other such that the pixel electrode 12Q on the upper glass substrate 11B overlaps the pixel electrode 12P on the lower glass substrate 11A when viewed perpendicularly to the glass substrate 11A. Thereby, a liquid crystal panel is obtained by injecting the liquid crystal layer 14 into the gap formed between the glass substrates 11A and 11B. It should be noted that FIG. 7C shows the liquid crystal panel as viewed from the upward direction, while FIG. 7D shows the same liquid crystal panel as viewed from the downward direction.

Further, a polarizer having an optical transmission axis 15a is disposed below the liquid crystal panel as the polarizer 15A as indicated in FIG. 7D, and a polarizer having an optical transmission axis 15b is disposed above the liquid crystal panel as the analyzer 15B. As FIGS. 7C and 7D show the same liquid crystal panel as viewed from opposite directions, it should be noted that the optical transmission axis 15a of the polarizer 15A and the optical transmission axis 15b of the analyzer 15B are in a crossed state. In other words, the polarizer 15A and the analyzer 15B are in a crossed Nicol state.

In FIGS. 7C and 7D, it should further be noted that the rubbing direction 11a of the glass substrate 11A and the rubbing direction 11b of the glass substrate 11B cross each other with an angle of 2α in the assembled state of the liquid crystal display device. As a result of the crossing of the rubbing directions, there is induced a twist angle of 2α in the liquid crystal molecules forming the liquid crystal layer 14.

In an investigation conducted on the VA-mode liquid crystal display device 20 thus formed, the inventor of the present invention has investigated the operational characteristic of the same while using various liquid crystals listed in TABLE I below for the liquid crystal layer 14. In the experiment, the thickness of the liquid crystal layer 14 was set to 3.4 μm throughout.

TABLE I

| liquid crystal | property | driving voltage (V) $V_{10}/V_{90}$ |
| --- | --- | --- |
| A MJ95785 Merck Japan | clearing point = 79° C. $\Delta\epsilon = -4.6$ $\Delta n = 0.0813$ | 2.37/5.86 |
| B MJ961213 Merck Japan | clearing point = 71° C. $\Delta\epsilon = -3.8$ $\Delta n = 0.0822$ | 2.43/5.85 |
| C MJ961320 Merck Japan | clearing point = 71° C. $\Delta\epsilon = -2.1$ $\Delta n = 0.0836$ | 3.20/6.88 |

Referring to TABLE I, the liquid crystal A is a commercially available N-type (negatively anisotropic) liquid crystal (MJ95785 of Merck Japan, Ltd.) used conventionally for a VA-mode liquid crystal display device and is characterized by negative dielectric anisotropy $\Delta\epsilon$ of −4.6, birefringence $\Delta n$ of 0.0813 and the temperature NI of liquid-crystal/liquid phase transition of 79° C. On the other hand, the liquid crystal B is an N-type liquid crystal used also for a VA-mode liquid crystal display device conventionally (MJ961213 of Merck Japan, Ltd.) and is characterized by negative dielectric anisotropy $\Delta\epsilon$ of −3.8, birefringence $\Delta n$ of 0.0822 and the temperature NI of liquid-crystal/liquid phase transition of 71° C. Further, the liquid crystal C is a commercially available N-type liquid crystal characterized by negative dielectric anisotropy $\Delta\epsilon$ of −2.1, birefringence $\Delta n \cdot d$ of 0.0836 and the temperature NI of liquid-crystal/liquid phase transition of 71° C. (MJ961320 of Merck Japan, Ltd.). It should be noted that each of the liquid crystals A–C is a fluorinated compound prepared in the form of a mixture of a plurality of liquid crystal compositions. It should be noted that the foregoing phase transition temperature of 71° C. generally includes an error and it is believed that the true phase transition temperature falls in a range of 70±1° C.

FIG. 8 shows the voltage holding ratio of the liquid crystal display device 20 at 70° C. for the case in which the liquid crystal A or the liquid crystal B is used for the liquid crystal layer 14, in comparison with the case in which a conventional TN-liquid crystal having a positive dielectric anisotropy is used for the liquid crystal layer 14. In FIG. 8, the solid triangles indicate the result for the case in which the liquid crystal A is used, while the solid circles indicate the result for the case in which the liquid crystal B is used. Further, the solid squares indicate the result for the case in which a TN-liquid crystal is used. It should be noted that the measurement of FIG. 8 is conducted at 70° C.

Figure 4:
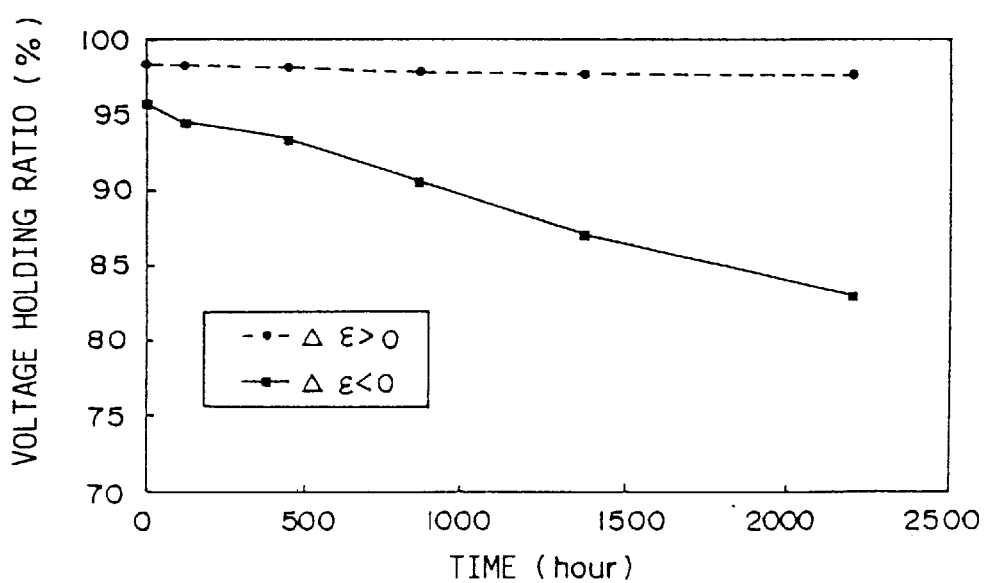
FIG. 4 is a diagram explaining the problem of decrease of the voltage holding ratio occurring in the conventional VA-mode liquid crystal display device.

Referring to FIG. 8, it can be seen that, while the voltage holding ratio decreases with time similarly to the case of FIG. 4 when the liquid crystal A having the dielectric anisotropy $\Delta\epsilon$ of −4.6 is used, it is noted that the voltage holding ratio does not change substantially with time when the liquid crystal B having the dielectric anisotropy $\Delta\epsilon$ of −3.8 is used. When the liquid crystal B is used, it can be seen that a voltage holding ratio comparable to that of a TN-mode liquid crystal display device is obtained.

Figure 2A:
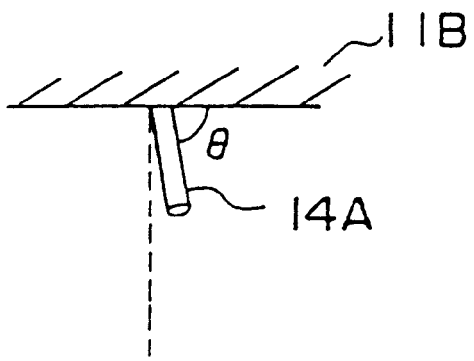
FIGS. 2A–2C are diagrams explaining the pre-tilt angle of the conventional VA-mode liquid crystal display device.
Figure 2B:
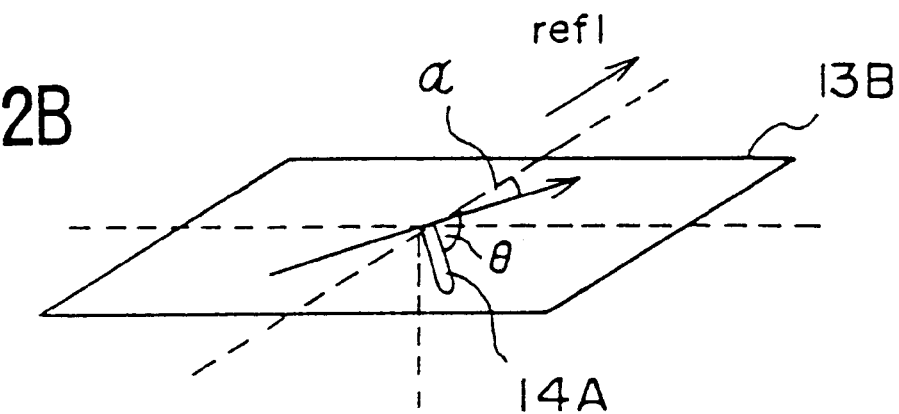
Figure 2C:
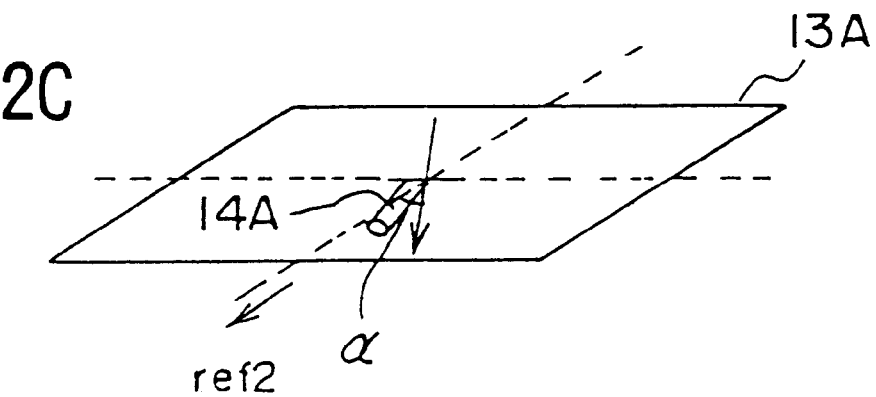
Figure 3:
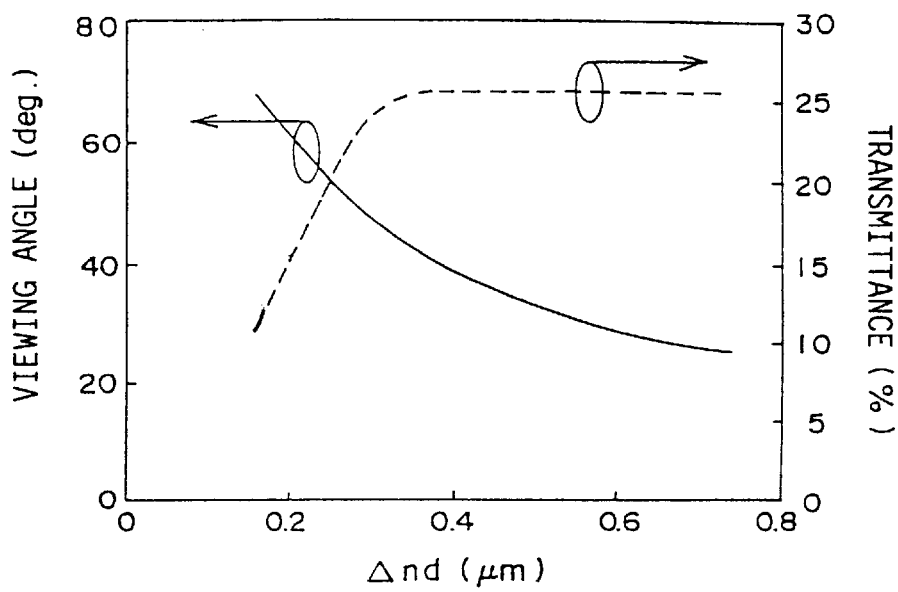
FIG. 3 is a diagram showing the view angle characteristic and the transmittance of the conventional VA-mode liquid crystal display device.

Further, the inventor of the present invention has discovered, in the liquid crystal display device 20, that the pre-tilt angle θ (see FIG. 2A) changes simultaneously to the dielectric anisotropy $\Delta\epsilon$ of the liquid crystal layer 14.

FIG. 9 shows the relationship between the pre-tilt angle θ of the liquid crystal molecule 14A in the liquid crystal display device 20 and the dielectric anisotropy $\Delta\epsilon$ of the liquid crystal layer 14.

Referring to FIG. 9, there is a tendency that the pre-tilt angle θ decreases slightly with a decrease in the magnitude of the dielectric anisotropy $\Delta\epsilon$. As explained previously, the pre-tilt angle is related to the response speed of the liquid crystal display device.

Figure 10:
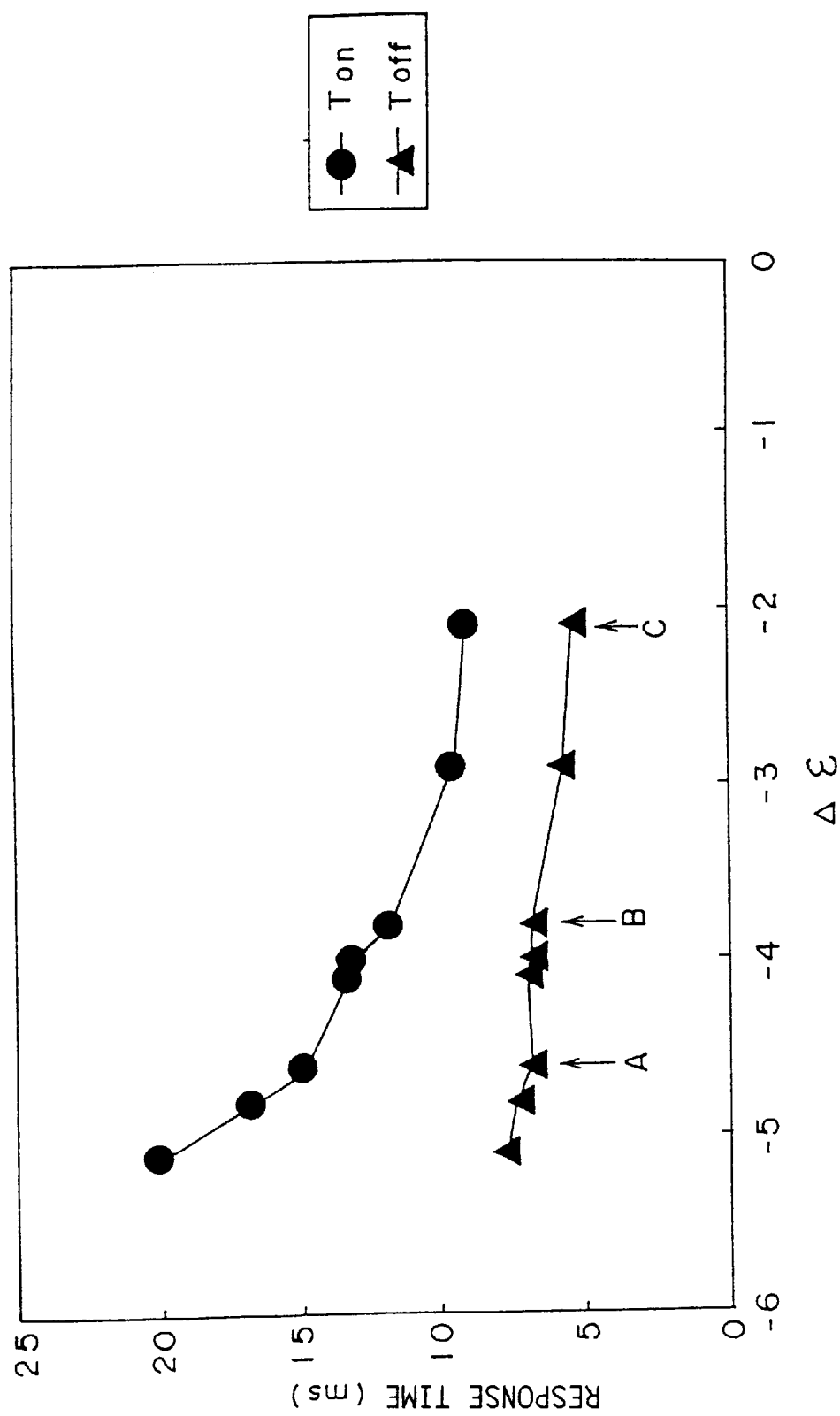
FIG. 10 is a diagram showing the response of the liquid crystal display device according to the first embodiment of the present invention.

FIG. 10 shows the relationship between the response speed of the liquid crystal display device 20 and the dielectric anisotropy $\Delta\epsilon$, wherein FIG. 10 represents, by the solid circles, the time $T_{ON}$ in which the transmittance of the liquid crystal display device 20 reaches 90% starting from the non-activated stated (0% transmittance). Similarly, FIG. 10 shows, by the solid triangles, the time $T_{OFF}$ in which the transmittance of the liquid crystal display device 20 reaches 10% starting from the fully activated stated (100% transmittance).

Referring to FIG. 10, it can be seen that, while the parameter $T_{OFF}$ is not very sensitive to the dielectric anisotropy $\Delta\epsilon$, the parameter $T_{ON}$ increases sharply when the magnitude of the dielectric anisotropy $\Delta\epsilon$ of the liquid crystal layer 14 has exceeded a value of 4. Thereby, the response speed of the liquid crystal display device is reduced inevitably.

Figure 11:
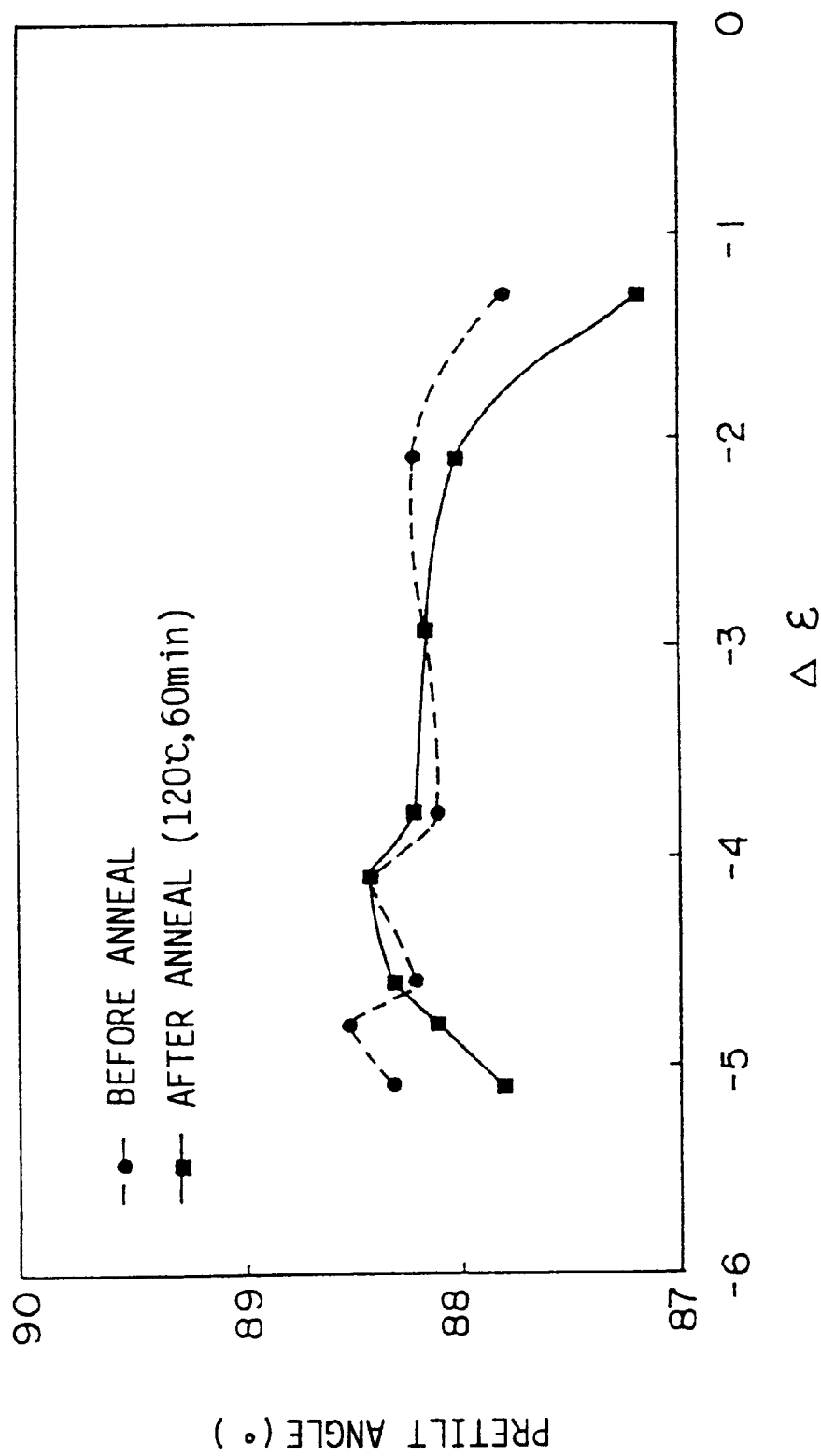
FIG. 11 is a diagram demonstrating the stability of the pre-tilt angle of the liquid crystal molecules against a thermal annealing process, achieved by the liquid crystal display device according to the first embodiment of the present invention.

Further, the inventor of the present invention has discovered, in the liquid crystal display device 20, that the pre-tilt angle θ changes when an annealing process is applied wherein such an annealing process is applied commonly in a liquid crystal display device after the liquid crystal layer 14 is confined between the substrate 11A and the substrate 11B, as indicated in FIG. 11.

Referring to FIG. 11, it can be seen that the change of the pre-tilt angle θ is small as long as the dielectric anisotropy $\Delta\epsilon$ falls in the range between −2 and −4, preferably in the range between −2 and −3.8, more preferably in the range between −3.0 and −3.8, most preferably in the range between −3.5 and −3.8. When the dielectric anisotropy $\Delta\epsilon$ increases or decreases and the value thereof goes outside the foregoing range, on the other hand, it can be seen that there appears a substantial change in the pre-tilt angle θ as a result of the annealing process. It should be noted that the result of FIG. 11 is obtained by a crystal rotation process conducted at 25° C.

Figure 12:
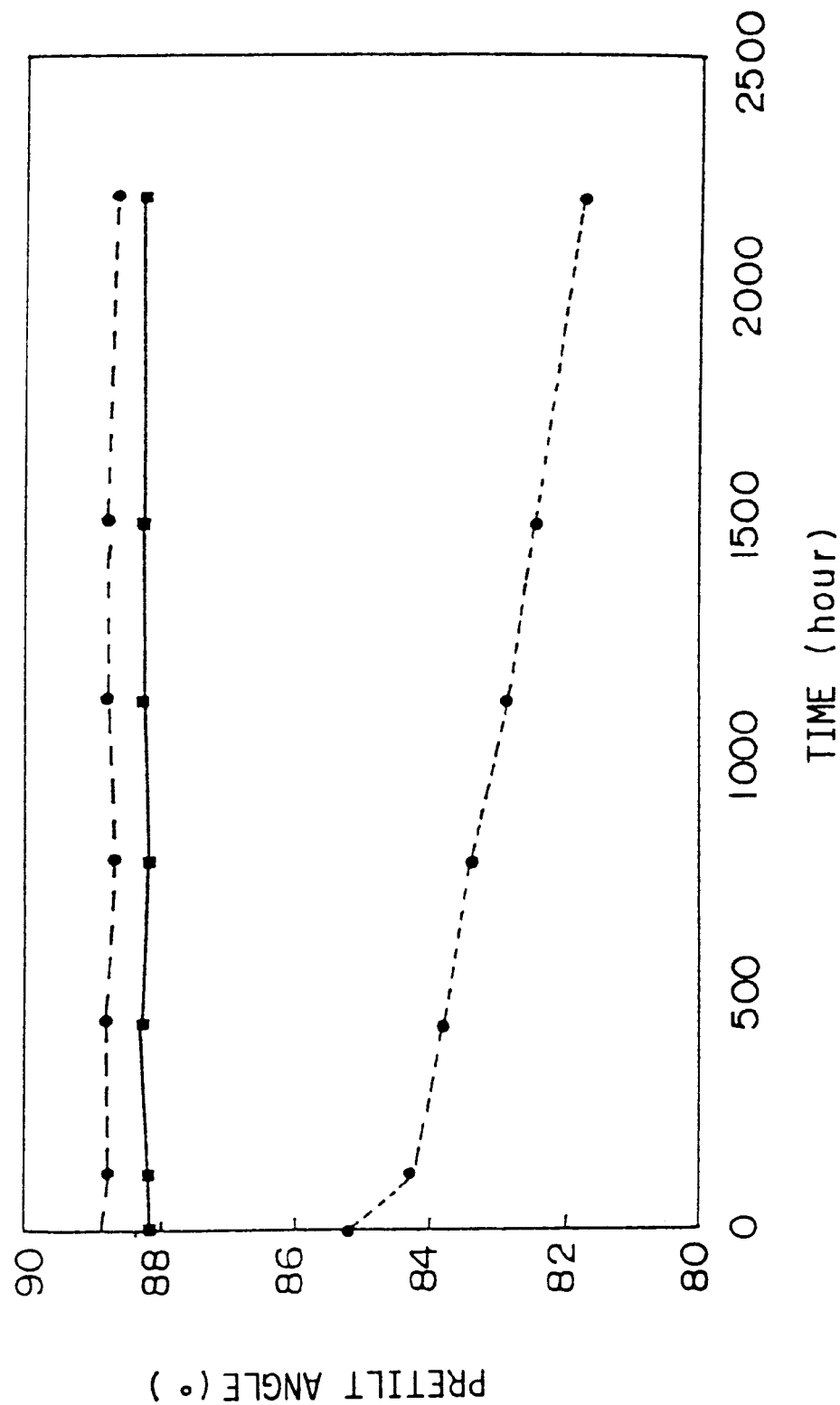
FIG. 12 is a diagram demonstrating the stability of the pre-tilt angle of the liquid crystal molecules with time, achieved by the liquid crystal display device according to the first embodiment of the present invention.

FIG. 12 shows the time-stability of the pre-tilt angle in the liquid crystal display device 20, wherein it should be noted that the result of FIG. 12 is obtained for the liquid crystal display device 20 left over at 70° C. for various durations. The measurement of the pre-tilt angle itself was conducted at 25° C.

Referring to FIG. 12, it can be seen that there occurs no substantial change in the pre-tilt angle when the initial pre-tilt angle is set to 88° or higher. When the initial pre-tilt angle decreases below about 86°, on the other hand, there appears a tendency that the pre-tilt angle decreases with time. When the pre-tilt angle becomes too small, there occurs a rotation in the polarization plane of the incident optical beam in the non-activated state of the liquid crystal display device, and the contrast of represented images is deteriorated.

From the foregoing, as well as from the relationship of FIG. 6 between the driving voltage and $\Delta\epsilon$, and further in view of the view angle characteristic, it is concluded that the value of the dielectric anisotropy $\Delta\epsilon$ of the liquid crystal layer 14 of the VA-mode liquid crystal display device 20 is preferably set in the range between about −3.8 and about −2.0.

Figure 13A:
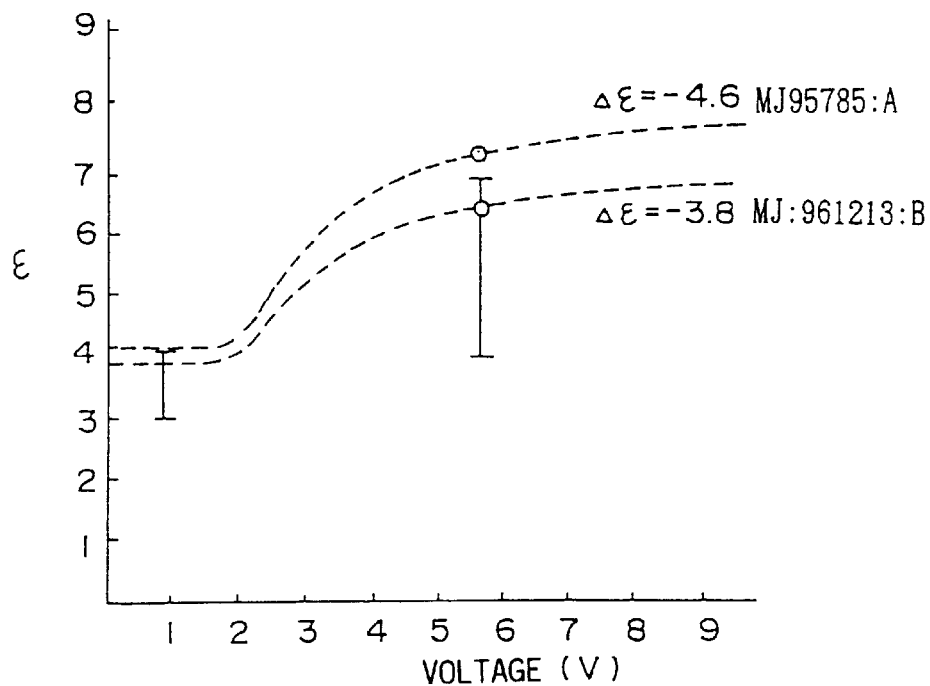
FIGS. 13A and 13B are diagrams showing the voltage-induced change of the dielectric constant in the liquid crystal display device according to the first embodiment of the present invention.
Figure 13B:
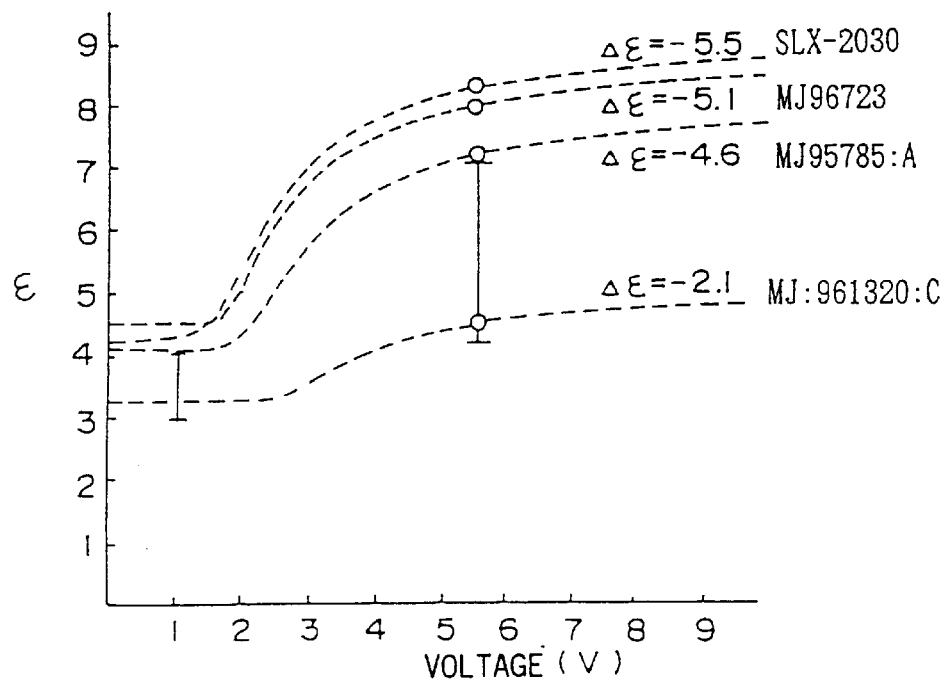

FIGS. 13A and 13B are diagrams showing the dielectric constant of the liquid crystal layer 14 in the liquid crystal display device 20 as a function of the driving voltage applied across the electrode patterns 12A and 12B, wherein FIG. 13A shows the case in which a liquid crystal having a dielectric anisotropy Δε of −4.6 and a birefringence Δn of 0.0813 (liquid crystal A) or a liquid crystal having a dielectric anisotropy Δε of −3.8 and a birefringence Δn of 0.0822 (liquid crystal B) is used for the liquid crystal layer 14, while FIG. 13B shows the case in which a liquid crystal having a dielectric anisotropy Δε of −5.5 and a birefringence Δn of 0.0945 (SLX-2030 of Shinetsu Chemicals, Co., Ltd.), or a liquid crystal having a dielectric anisotropy Δε of −5.1 and a birefringence Δn of 0.0793 (MJ96723 of Merck Japan, Ltd.), or a liquid crystal having a dielectric anisotropy Δε of −4.6 and a birefringence Δn of 0.0813 (liquid crystal A), or a liquid crystal having a dielectric anisotropy Δε of −2.1 and a birefringence Δn of 0.0836 (liquid crystal C), is used for the liquid crystal layer 14. It should be noted that all the liquid crystals except for the liquid crystal SLX-2030 are fluorinated liquid crystals, while the liquid crystal SLX-2030 is a silicon compound (—Si—) containing fluorine (F).

Referring to FIGS. 13A and 13B, it can be seen that the liquid crystal layer 14 changes the dielectric constant with the driving voltage applied across the electrode patterns 12A and 12B, due to the change occurring in the alignment direction of the liquid crystal molecules between the non-activated state in which a driving voltage not exceeding a predetermined threshold voltage is applied across the electrode patterns 12A and 12B and the activated state in which a driving voltage exceeding the predetermined threshold voltage is applied across the electrode patterns 12A and 12B. In the non-activated state, a dielectric constant corresponding to the major axis or long axis of the liquid crystal molecules 14A is observed as the dielectric constant of the liquid crystal layer 14, while in the activated state, a dielectric constant corresponding to the minor axis, or short axis, of the liquid crystal molecules is observed as the dielectric constant of the liquid crystal layer 14.

When the value of the dielectric anisotropy Δε of the liquid crystal layer 14 is set to the foregoing preferable range of between about −3.8 and about −2.0 as explained previously, the liquid crystal layer 14 shows a dielectric constant between 4.0 and 7.0 in the activated state (white representation mode) in which a driving voltage of about 5.5 V is applied across the electrode patterns 12A and 12B. In the non-activated state (black representation mode), on the other hand, the liquid crystal layer 14 shows a dielectric constant between 3.0 and 4.2.

Figure 14:
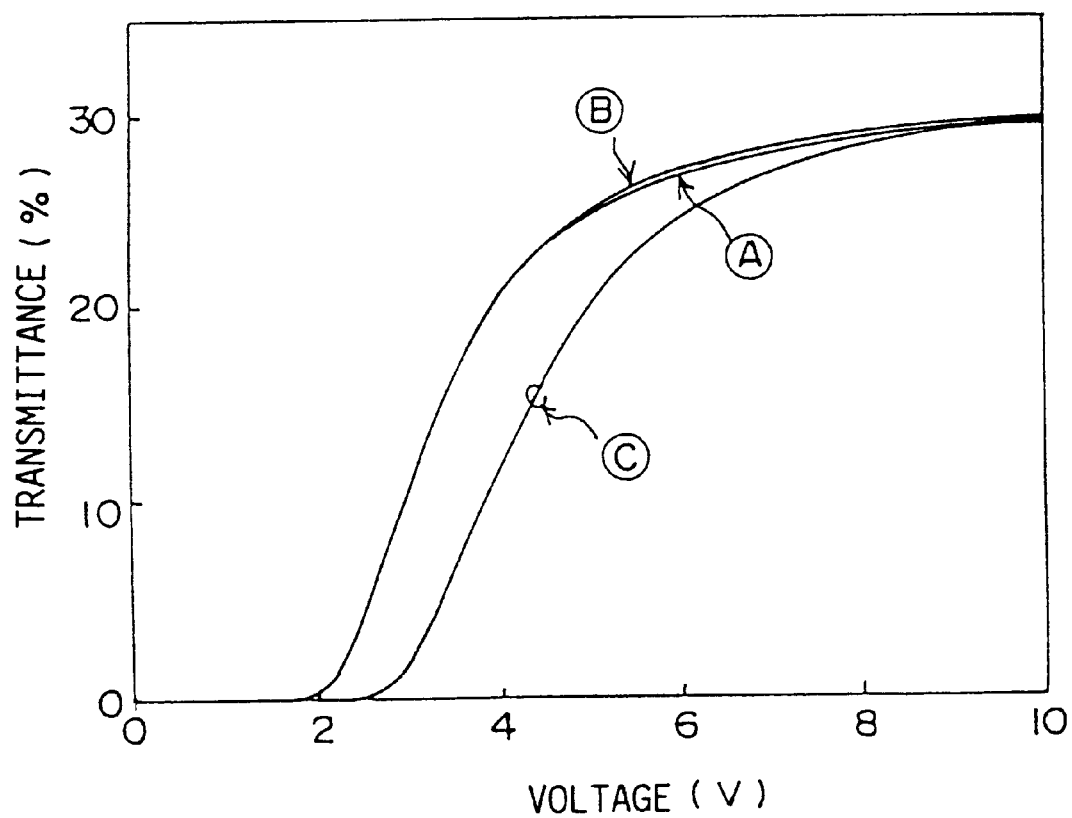
FIG. 14 is a diagram showing the voltage-induced change of the transmittance of the liquid crystal display device according to the first embodiment of the present invention.

FIG. 14 shows the relationship of driving voltage and the transmittance of the liquid crystal display device 20 for the case in which the foregoing liquid crystals A, B and C are used for the liquid crystal layer 14.

Referring to FIG. 14 showing the transmittance in terms of relative brightness of representation of the liquid crystal display device 20, it can be seen that the transmittance for the case in which the liquid crystal B having the dielectric anisotropy Δε of −3.8 is used for the liquid crystal layer 14, is substantially identical with the transmittance obtained for the case in which the liquid crystal A having the dielectric anisotropy Δε of −4.6 is used for the same purpose. In the case in which the liquid crystal C having the dielectric anisotropy Δε of −2.1 is used, on the other hand, it can be seen that the transmittance decreases slightly. In correspondence to this, it is necessary to increase the driving voltage slightly.

Figures 15A, 15B:
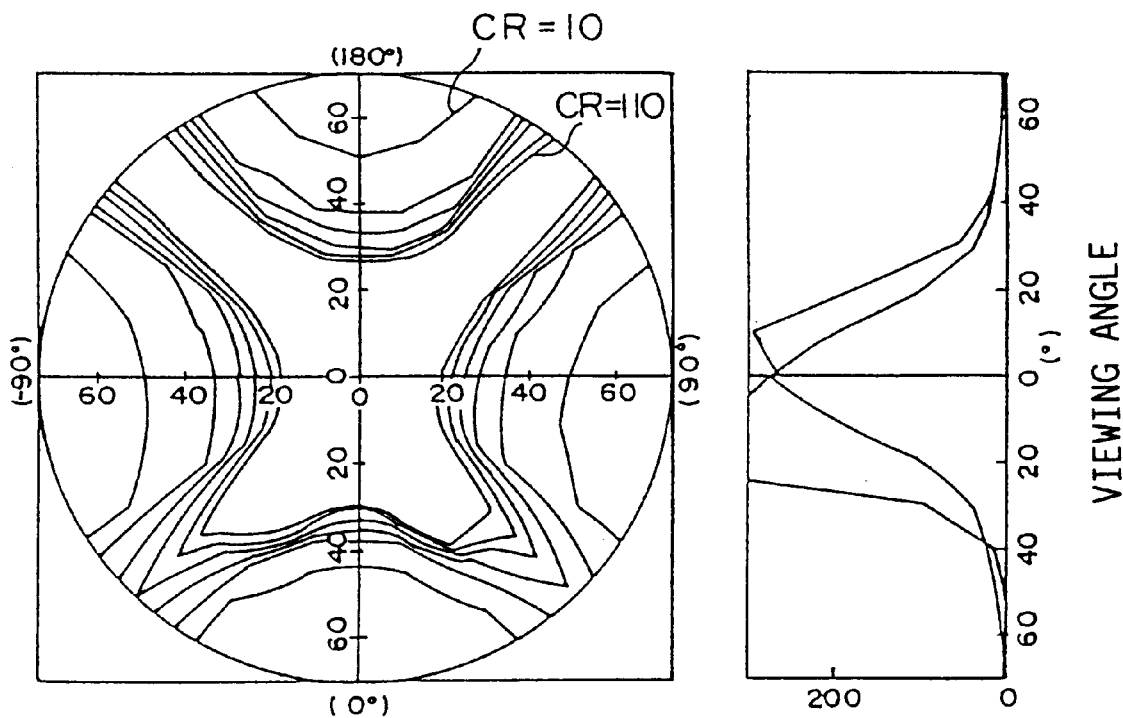
FIGS. 15A and 15B are diagrams showing the view angle characteristic of the liquid crystal display device according to the first embodiment of the present invention.

FIG. 15A shows the view angle characteristic of the liquid crystal display device 20 for the case in which the liquid crystal B is used, wherein FIG. 15A shows the azimuth angle along the circumference of the drawing, while the cross lines of FIG. 15A represent the polar angle. FIG. 15A further represents the contrast ratio from 10 to 110 in the form of contours. Further, FIG. 15B shows the contrast profile of the liquid crystal display device 20 for a specific azimuth angle while changing the polar angle from −70° to +70°.

Referring to FIGS. 15A and 15B, it can be seen that the liquid crystal display device 20 provides an excellent contrast ratio and view angle characteristic by setting the value of the retardation Δn·d of the liquid crystal layer 14 to the range between 0.2 μm and 0.4 μm, even in the case the dielectric anisotropy Δε is set to the range between −3.8 and −2.0. Further, a similar result is obtained also for the liquid crystals A and C that have a retardation value Δn·d similar to the retardation value Δn·d of the liquid crystal B. It should be noted that the result of FIG. 15A is for the case in which no retardation compensation film is disposed outside the glass substrate 11A or 11B. Thus, the view angle characteristic of the liquid crystal display device 20 would be improved further by providing such additional retardation compensation films.

Second Embodiment

Figure 16:
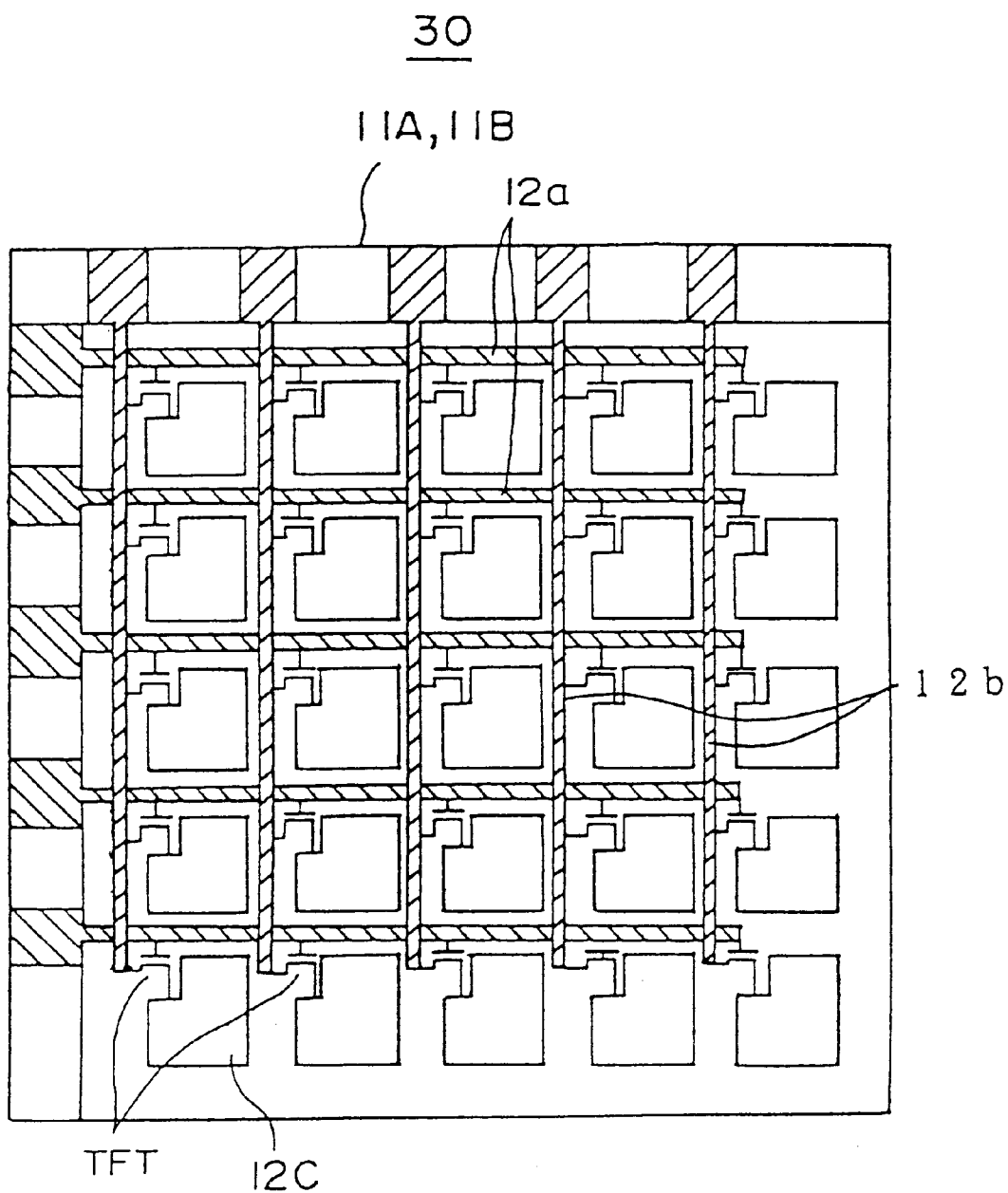
FIG. 16 is a diagram showing the construction of an active-matrix liquid crystal display device according to a second embodiment of the present invention.

FIG. 16 shows the construction of an active-matrix driven liquid crystal display device 30 according to a second embodiment of the present invention, wherein those parts corresponding to the parts described previously are designated by the same reference numerals.

Referring to FIG. 16, the liquid crystal display device 30 is a modification of the liquid crystal display device 20 and includes electrode patterns 12a extending on the substrate 11A in a row direction as an address line and electrode patterns 12b extending in a column direction as a data line. The electrode patterns 12a and 12b correspond to the electrode patterns 12A of FIG. 7B. On the other hand, the transparent electrode pattern 12B on the substrate 11B of FIG. 7B is now formed so as to cover the entire surface of the substrate 11B with more or less a uniform thickness. Further, the substrate 11A carries, on the part thereof in which an address line 11A crosses a data line 12b, a thin film transistor (TFT) and a transparent pixel electrode 12C cooperating with the TFT. Further, the substrate 11B may carry a color filter (not shown) in correspondence to each of the foregoing transparent pixel electrodes 12C.

Using the liquid crystal display device 30 of FIG. 16, the inventor of the present invention has conducted an experiment on the residual d.c. voltage, and hence the afterimage caused in the liquid crystal display device 30 by the electric charges remaining in the liquid crystal layer 14, by using the foregoing liquid crystal A (Δε=−4.6, Δn=0.0813) and the foregoing liquid crystal B (Δε=−3.8, Δn=0.0822), as well as the liquid crystal D (Δε=−5.1, Δn=0.0793) for the liquid crystal layer 14. The experiment was conducted by first driving the liquid crystal display device 30 with an optimum driving voltage, removing the driving voltage, and further driving the liquid crystal display device 30 with the optimum driving voltage second time. Thereby, the afterimage formation is evaluated as the decrease of transmittance observed in the second time driving of the liquid crystal display device 30 as compared with the first time driving.

As a result of the experiment, an afterimage formation of about 3% was observed for the liquid crystal display device 30 when the liquid crystal A is used for the liquid crystal layer 14. When the liquid crystal B is used, on the other hand, it was found that the after image formation increases to about 5%. Further, when the liquid crystal D is used, it was observed that the after image formation increases to about 9%. From the foregoing, it is concluded that the dielectric anisotropy Δε of the liquid crystal layer 14 is preferably set to the range between about −3.8 and about −2.0.

Third Embodiment

Figure 17A:
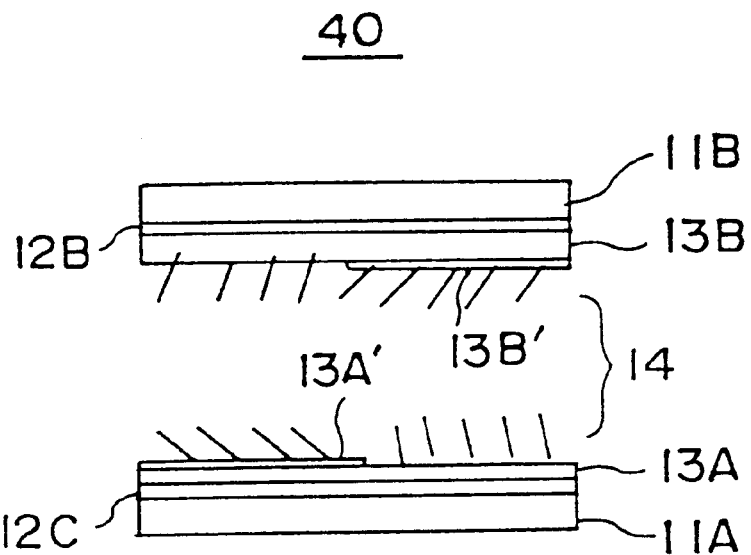
FIGS. 17A and 17B are diagrams showing the construction of a liquid crystal display device having a domain structure according to a third embodiment of the present invention.
Figure 17B:
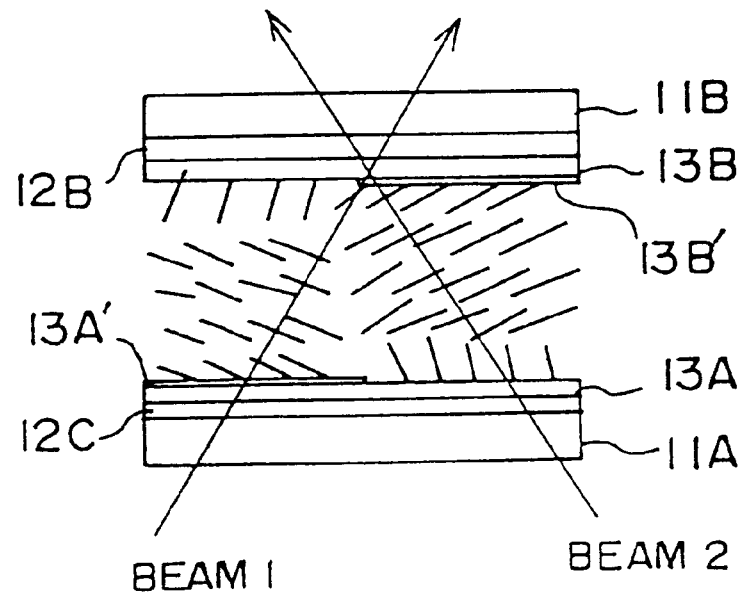

FIGS. 17A and 17B show in part the construction of a liquid crystal display device 40 according to a third embodiment of the present invention respectively in a non-activated state and in an activated state. As the liquid crystal display device 40 is a modification of the liquid crystal display device 30 of the previous embodiment, those parts corresponding to the parts described previously are designated by the same reference numerals and the description thereof will be omitted.

Referring to FIGS. 17A and 17B, the liquid crystal display device 40 includes a molecular alignment film 13A' different from the molecular alignment film 13A on the part of the molecular alignment film 13A corresponding to the pixel electrode 12C. Similarly, the molecular alignment film 13B carries, on the part thereof corresponding to the part of the molecular alignment film 13A not covered by the molecular alignment film 13A', a molecular alignment film 13B' different from the molecular alignment film 13B. Thereby, the molecular alignment film 13A' faces the exposed part of the molecular alignment film 13B.

By changing the composition or rubbing direction between the molecular alignment film 13A and the molecular alignment film 13A' or between the molecular alignment film 13B and the molecular alignment film 13B', the pre-tilt angle of the liquid crystal molecules changes between the part where the molecular alignment film 13A is exposed and the part where the molecular alignment film 13A' is provided, or between the part where the molecular alignment film 13B' is provided and the part where the molecular alignment film 13A is exposed. In other words, there appears a domain structure in the pixel region of the liquid crystal display device 40.

As indicated in FIG. 17B, the liquid crystal molecules 14A align generally horizontally in the activated state of the liquid crystal display device 40, wherein the inclination state of the liquid crystal molecules 14A becomes symmetric in the region of the pixel where the molecular alignment film 13A' is formed and in the region where the molecular alignment film 13B' is formed. Thereby, the liquid crystal display device 40 causes the optical beams 1 and 2 incident thereto at different incident angles to pass therethrough with more or less the same transmittance.

By using the domain structure of FIGS. 17A and 17B in the liquid crystal display device 30 of FIG. 16, the view angle characteristic of the liquid crystal display device is improved further.

Further, it should be noted that the present invention is not limited to VA-mode liquid crystal display devices but is applicable also to general liquid crystal display devices that uses an N-type liquid crystal.

Further, the present invention is not limited to the embodiments described heretofore, but various variations and modifications may be made without departing from the scope of the invention.

What is claimed is:

1. A liquid crystal display device, comprising:

a first substrate;

a second substrate disposed generally parallel to said first substrate;

a first electrode pattern formed on a first principal surface of said first substrate facing said second substrate;

a first molecular alignment film formed on said first principal surface so as to cover said first electrode pattern;

a second electrode pattern formed on a second principal surface of said second substrate facing said first substrate;

a second molecular alignment film formed on said second principal surface so as to cover said second electrode pattern;

a liquid crystal layer confined between said first molecular alignment film and said second molecular alignment film, said liquid crystal layer comprising a liquid crystal mixture of a plurality of liquid crystal compositions at least including liquid crystal molecules having a negative dielectric anisotropy such that said liquid crystal molecules align generally perpendicularly to said first principal surface in a non-activated state of said liquid crystal display device in which no driving voltage is applied across said first and second electrode patterns, said first substrate, said second substrate, said first electrode pattern, said second electrode pattern, said first molecular alignment film, said second molecular alignment film and said liquid crystal layer thereby forming a liquid crystal panel, a first polarization element disposed at a first side of said liquid crystal panel;

a second polarization element disposed at a second, opposite side of said liquid crystal panel;

said liquid crystal mixture having a dielectric anisotropy in a range between −3.8 and about −2.0.

2. A liquid crystal display device as claimed in claim 1, wherein said liquid crystal mixture has a dielectric anisotropy in a range between −3.8 and −3.0.

3. A liquid crystal display device as claimed in claim 1, wherein said liquid crystal mixture has a dielectric anisotropy in a range between −3.8 and −3.5.

4. A liquid crystal display device as claimed in claim 1, wherein said liquid crystal mixture has a dielectric constant measured in a major axis direction thereof such that said dielectric constant falls in a range between about 3.0 and about 4.2.

5. A liquid crystal display device as claimed in claim 1, wherein said liquid crystal layer shows a dielectric constant in a range between about 3.0 and about 4.2 in a non-activated state thereof and wherein said liquid crystal layer shows a dielectric constant in a range between about 4.0 and about 7.0 in an activated state thereof in which a driving voltage is applied across said first and second electrode patterns.

6. A liquid crystal display device as claimed in claim 1, wherein said liquid crystal layer has a phase transition temperature between a liquid crystal phase and a liquid phase of 70° C. or higher, and wherein said liquid crystal shows a nematic phase in a temperature range between −20° C. and 70° C.

7. A liquid crystal display device as claimed in claim 1, wherein said liquid crystal layer has a retardation between about 0.2 μm and about 0.4 μm.

8. A liquid crystal display device as claimed in claim 1, wherein said liquid crystal molecules have a pre-tilt angle of larger than about 87° but smaller than 90°.

9. A liquid crystal display device as claimed in claim 8, wherein said pre-tilt angle of said liquid crystal molecules falls in a range between about 88° and about 89°.

10. A liquid crystal display device as claimed in claim 1, wherein said liquid crystal molecules show a twist angle larger than 0° but smaller than 180° in said liquid crystal layer.

11. A liquid crystal display device as claimed in claim 10, wherein said twist angle of said liquid crystal molecules is determined by a rubbing of said first and second molecular alignment films.

12. A liquid crystal display device as claimed in claim 1, wherein said liquid crystal layer includes a plurality of pixel regions in correspondence to an intersection of said first electrode pattern and said second electrode pattern, and wherein each of said pixel regions includes a plurality of domains in which direction of molecular alignment is different from each other.

13. A liquid crystal display device, comprising:

a first substrate;

a second substrate disposed generally parallel to said first substrate;

a first electrode pattern formed on a first principal surface of said first substrate facing said second substrate;

a first molecular alignment film formed on said first principal surface so as to cover said first electrode pattern;

a second electrode pattern formed on a second principal surface of said second substrate facing said first substrate;

a second molecular alignment film formed on said second principal surface so as to cover said second electrode pattern;

a liquid crystal layer confined between said first molecular alignment film and said second molecular alignment film, said liquid crystal layer comprising a liquid crystal mixture of a plurality of liquid crystal compositions at least including liquid crystal molecules having a negative dielectric anisotropy, said first substrate, said second substrate, said first electrode pattern, said second electrode pattern, said first molecular alignment film, said second molecular alignment film and said liquid crystal layer thereby forming a liquid crystal panel, a first polarization element disposed at a first side of said liquid crystal panel;

a second polarization element disposed at a second, opposite side of said liquid crystal panel;

said liquid crystal mixture having a dielectric anisotropy in a range between −3.8 and about −2.0.

14. A liquid crystal display device as claimed in claim 13, wherein said liquid crystal mixture has a dielectric anisotropy in a range between −3.8 and −3.0.

15. A liquid crystal display device as claimed in claim 13, wherein said liquid crystal mixture has a dielectric anisotropy in a range between −3.8 and −3.5.

* * * * *